United States Patent
Choi et al.

(10) Patent No.: US 11,497,175 B2
(45) Date of Patent: Nov. 15, 2022

(54) PLANT GROWER

(71) Applicant: LG ELECTRONICS INC., Seoul (KR)

(72) Inventors: Younsung Choi, Seoul (KR); Eunjung Lee, Seoul (KR); Kangseong Lee, Seoul (KR); Takashi Morimoto, Seoul (KR); Masako Ikeda, Seoul (KR); Hiromu Imanishi, Seoul (KR); Masami Yokota, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/127,256

(22) Filed: Dec. 18, 2020

(65) Prior Publication Data
US 2021/0185938 A1    Jun. 24, 2021

(30) Foreign Application Priority Data

Dec. 20, 2019    (KR) .................. 10-2019-0171766

(51) Int. Cl.
*A01G 9/02*    (2018.01)
*A01G 27/00*    (2006.01)
(Continued)

(52) U.S. Cl.
CPC ............ *A01G 9/025* (2013.01); *A01G 9/243* (2013.01); *A01G 9/247* (2013.01); *A01G 9/249* (2019.05); *A01G 9/26* (2013.01); *A01G 27/005* (2013.01)

(58) Field of Classification Search
CPC ........ A01G 9/022; A01G 9/025; A01G 9/243; A01G 9/247; A01G 9/249; A01G 9/26; A01G 27/005
(Continued)

(56) References Cited

U.S. PATENT DOCUMENTS 4,216,617 A * 8/1980 Schmidt ................. A01G 31/06
                                                              47/62 A
4,250,666 A * 2/1981 Rakestraw ............. A01G 9/023
                                                              47/83
(Continued)

FOREIGN PATENT DOCUMENTS

CN         107182597 A  *  9/2017
CN         110521578 A  * 12/2019
(Continued)

OTHER PUBLICATIONS

English-language translation of KR 20170067605A (Year: 2017).*

*Primary Examiner* — Magdalena Topolski
(74) *Attorney, Agent, or Firm* — Birch, Stewart, Kolasch & Birch, LLP

(57) ABSTRACT

A plant grower includes a base, an upper cover having a surface parallel to an upper surface of the base, the upper cover being disposed above the base so as to be spaced apart from the upper surface of the base, a plurality of growing panels disposed along the circumference of the upper surface of the base, the plurality of growing panels being rotatably disposed at the base and the upper cover, and a lighting bar extending vertically upwards from the center of the upper surface of the base to the upper cover, the lighting bar emitting light in a direction in which the plurality of growing panels is disposed, and a plurality of growing holders, into each of which a plant is inserted, disposed at one surface of each of the plurality of growing panels.

16 Claims, 15 Drawing Sheets

(51) Int. Cl.
*A01G 9/24* (2006.01)
*A01G 9/26* (2006.01)

(58) Field of Classification Search
USPC .................................................. 47/82, 83
See application file for complete search history.

(56) References Cited

U.S. PATENT DOCUMENTS

| | | | | |
|---|---|---|---|---|
| 4,683,674 A * | 8/1987 | Faul | ....................... | C05F 17/907 47/83 |
| 4,869,019 A * | 9/1989 | Ehrlich | .................. | A01G 31/06 47/62 A |
| 4,920,695 A * | 5/1990 | Garden | ................... | C05D 9/00 47/67 |
| 4,965,962 A * | 10/1990 | Akagi | ................... | A01G 31/045 47/62 A |
| 5,617,673 A * | 4/1997 | Takashima | ........... | A01G 31/047 47/60 |
| 5,675,931 A * | 10/1997 | Wasserman | .............. | A01G 9/00 47/39 |
| 6,269,589 B1 * | 8/2001 | Bouler | .................. | A01G 9/023 47/65.5 |
| 6,477,805 B2 * | 11/2002 | Ware | ...................... | A01G 9/025 47/83 |
| D638,743 S * | 5/2011 | Bouchard | ................... | D11/143 |
| 8,225,549 B2 * | 7/2012 | Simmons | ............... | A01G 31/02 47/62 N |
| 9,374,952 B1 * | 6/2016 | Cross | .................. | A01G 31/047 |
| 10,477,786 B1 * | 11/2019 | Wilson | ................. | A01G 31/047 |
| 10,667,468 B1 * | 6/2020 | Tang | ....................... | A01G 9/249 |
| D896,690 S * | 9/2020 | Adolf | ........................... | D11/152 |
| 11,240,974 B2 * | 2/2022 | Hunter | .................. | A01G 9/249 |
| 2005/0039396 A1 * | 2/2005 | Marchildon | ......... | A01G 31/047 47/62 E |
| 2008/0236036 A1 * | 10/2008 | Feuz | ...................... | A01G 9/025 47/39 |
| 2008/0302009 A1 * | 12/2008 | Frecon | .................. | A01G 9/022 47/83 |
| 2013/0152468 A1 * | 6/2013 | Huang | .................. | A01G 31/06 47/65.5 |
| 2014/0000162 A1 * | 1/2014 | Blank | .................... | A01G 31/06 47/62 A |
| 2014/0144079 A1 * | 5/2014 | Lin | ........................ | A01G 9/249 47/62 R |
| 2014/0290137 A1 * | 10/2014 | Nagels | .................. | A01G 31/06 47/62 R |
| 2014/0318007 A1 * | 10/2014 | Hogan | .................... | A01K 1/00 47/39 |
| 2015/0351325 A1 * | 12/2015 | Shelor | .................... | H05B 45/20 47/58.1 LS |
| 2016/0212946 A1 * | 7/2016 | Higgins | ............... | A01G 9/1423 |
| 2018/0064037 A1 * | 3/2018 | Tyink | ..................... | A01G 31/06 |
| 2018/0084744 A1 * | 3/2018 | Tidona | .................. | A01G 9/023 |
| 2018/0220595 A1 * | 8/2018 | Hancock | ................ | A01G 9/023 |
| 2018/0325056 A1 * | 11/2018 | Stolzfus | ................ | A01G 31/06 |
| 2019/0059242 A1 * | 2/2019 | Bogner | .................. | A01G 9/18 |
| 2019/0208711 A1 * | 7/2019 | Sahu | ...................... | A01G 9/247 |
| 2020/0275622 A1 * | 9/2020 | Elliott | ................... | A01G 9/249 |
| 2021/0212270 A1 * | 7/2021 | Booker-Ogunde | .... | A01G 9/028 |

FOREIGN PATENT DOCUMENTS

| | | | | |
|---|---|---|---|---|
| FR | 2680627 A1 * | 3/1993 | ............ | A01G 31/06 |
| KR | 20150088065 A * | 7/2015 | | |
| KR | 20170067605 A * | 6/2017 | | |
| KR | 200485275 Y1 * | 12/2017 | | |
| KR | 101835282 B1 * | 3/2018 | | |
| KR | 20210034403 A * | 3/2021 | | |
| WO | WO-2018035314 A1 * | 2/2018 | ............ | A01G 9/246 |
| WO | WO-2020041242 A1 * | 2/2020 | ............ | A01G 9/247 |

* cited by examiner

PLANT GROWER

CROSS-REFERENCE TO RELATED APPLICATION

This application claims the priority benefit of Korean Patent Application No. 10-2019-0171766, filed in the Republic of Korea on Dec. 20, 2019, the disclosure of which is incorporated herein by reference in its entirety.

BACKGROUND

Field of the Invention

The present disclosure relates to a plant grower, and more particularly to a plant grower capable of easily growing and managing plants indoors.

Description of the Related Art

Modern people who are greatly concerned about healthy food have felt mental satisfaction in direct cultivation of a vegetable garden and harvesting. As a result, an indoor plant grower for home use capable of growing plants for self-sufficiency, such as vegetables, or decorative plants has been developed.

In the case in which a plant grower is disposed indoors, a small space problem and a problem in which it is difficult for plants to be exposed to natural light may occur. In the case in which artificial lighting is used to solve the natural light problem, light is discharged to a space outside the plant grower, whereby user discomfort may be caused.

Korean Registered Patent No. KR10-1959722 discloses a plant growing container installable indoors, wherein artificial lighting is included but a transparent window for monitoring from the outside is provided, whereby light is emitted to the outside of the plant growing container.

Also, in the case in which plants are grown in general homes, a water supply period is not uniform, whereby the plants may not be appropriately grown.

SUMMARY

An object of the present disclosure is to provide a plant grower capable of growing plants in an indoor environment, such as a residential space, or in an outdoor environment.

Another object of the present disclosure is to provide a plant grower capable of supplying light emitted from a lighting device to plants in order to rapidly grow the plants while preventing the light from being discharged to the outside of the plant grower.

Another object of the present disclosure is to provide a plant grower capable of easily checking the states of plants grown therein.

A further object of the present disclosure is to provide a plant grower capable of appropriately supplying water and nutrients to plants.

Objects of the present disclosure are not limited to the aforementioned objects, and other unmentioned objects will be clearly understood by those skilled in the art based on the following description.

In accordance with the present disclosure, the above and other objects can be accomplished by the provision of a plant grower including a plurality of growing panels rotatably disposed between a base and an upper cover and a lighting bar extending vertically upwards from a center of the upper surface of the base to the upper cover, the lighting bar being configured to emit light in a direction in which the plurality of growing panels is disposed, wherein a plurality of growing holders, into each of which a plant is inserted, is disposed at one surface of each of the plurality of growing panels, and the one surface of each of the plurality of growing panels, at which the plurality of growing holders is disposed, is disposed at a first position at which the one surface faces the lighting bar or at a second position at which the one surface faces a direction opposite the first position, whereby it is possible to emit natural light or artificial light generated by the lighting bar to the plants mounted to the growing panels.

The lighting bar may emit light when the plurality of growing panels is disposed at the first position. Consequently, light may be emitted to the growing panels only at needed, and the lighting bar may not be operated when natural light is supplied to the growing panels, whereby it is possible to prevent power consumption.

Each of the plurality of growing panels may include a main body rotatably disposed at the base, the plurality of growing holders being disposed at one surface of the main body, and a pair of wings disposed at opposite sides of the main body so as to be rotatable relative to the main body. The wings may cover opposite sides of the growing panel at which the growing holders are disposed. When the lighting bar emits light, therefore, it is possible to prevent the light from being discharged to the outside.

The pair of wings may be disposed so as to face adjacent growing panels when the plurality of growing panels is disposed at the first position. When the lighting bar emits light, therefore, it is possible to prevent the light from being discharged to the outside.

The main body may include a first panel, at which the plurality of growing holders is disposed, and a second panel coupled to the first panel such that a space is defined therebetween.

The first panel and the second panel may have curved surfaces convex in directions opposite a direction in which the first panel and the second panel face each other, and the inner space may be defined between the first panel and the second panel, whereby it is possible to utilize the inner space of the growing panel.

Each of the plurality of growing holders may be provided with a communication hole, through which the interior of the growing holder, into which the plant is inserted, and the inner space defined between the first panel and the second panel communicate with each other, and a supply pipe configured to supply water in a direction in which the communication hole is formed may be disposed in the inner space, whereby it is possible to supply water to the plants inserted into the growing panel.

The supply pipe may be fixedly disposed at the inner surface of the second panel, and the supply pipe may inject water or nutrients toward the inner surface of the first panel.

The main body may further include an upper panel configured to cover the upper side of each of the first panel and the second panel and a lower panel configured to cover the lower side of each of the first panel and the second panel, and a water drainage hole, through which water is drained, may be formed in the portion of the lower panel at which the center of rotation of the growing panel is located, whereby it is possible to collect water discharged to the supply pipe.

The inner surface of the lower panel may be inclined toward the water drainage hole, whereby it is possible to prevent water from gathering in the growing panel.

The plant grower may further include an ultraviolet lamp disposed in the inner space defined between the first panel and the second panel so as to be movable in an upward-downward direction, the ultraviolet lamp being configured to emit ultraviolet light to the inner surface of the first panel and the inner surface of the second panel, whereby it is possible to prevent contamination in the inner space.

A guide rail configured to guide movement of the ultraviolet lamp may be disposed at the inner surface of the second panel, and the ultraviolet lamp may be configured to move along the guide rail in the upward-downward direction, whereby it is possible to sterilize the entirety of the inner space.

The base may include a base housing configured to define the external appearance thereof, a first storage tank disposed in the base housing, the first storage tank being configured to store water, and a pump disposed in the base housing, the pump being configured to the feed a fluid stored in the first storage tank to the plurality of growing panels.

A plurality of base water supply pipes, which is connected to the pump and each of which is configured to send water discharged from the pump to the supply pipe disposed at a corresponding one of the plurality of growing panels, may be disposed in the base housing, whereby it is possible to supply water to each of the plurality of growing panels.

A plurality of base water drainage pipes, which is connected to the first storage tank and each of which is connected to the water drainage hole formed in a corresponding one of the plurality of growing panels, may be disposed in the base housing, and each of the plurality of base water supply pipes may extend to the water drainage hole through a corresponding one of the plurality of base water drainage pipes, whereby it is possible to circulate the water in the first storage tank so as to be supplied to the growing panels.

The base may further include a second storage tank disposed in the base housing, the second storage tank being configured to store nutrients, the second storage tank and the pump may be connected to each other via a second connection pipe, and an opening and closing valve configured to open and close the second connection pipe may be disposed in the second connection pipe, whereby it is possible to supply nutrients to the growing panels and to supply an appropriate amount of nutrients in a structure in which water is circulated.

The upper cover may include a solar panel configured to generate electricity using sunlight, whereby it is possible to replenish electric power through the sunlight.

The base may include a battery configured to store electric power, and the battery may store electric power supplied from the solar panel disposed at the upper cover, whereby it is possible to reduce power consumption.

The plant grower may further include an image capture unit disposed around the lighting bar, the image capture unit being disposed so as to be movable along the lighting bar in the upward-downward direction, the image capture unit being configured to capture images of states of plants mounted to the plurality of growing panels, whereby it is possible to monitor states of the plants inserted into the growing panels through the image capture unit.

The image capture unit may include a camera sensor, an upward-downward movement unit configured to move the camera sensor in the upward-downward direction, and a rotation unit configured to rotate the camera sensor 360 degrees in a direction perpendicular to the direction in which the upward-downward movement unit moves, whereby it is possible to monitor overall states of the plurality of plants disposed at each of the plurality of growing panels.

The details of other embodiments are included in the following detailed description of the present disclosure and the accompanying drawings.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION OF THE EMBODIMENTS

Figure 1:
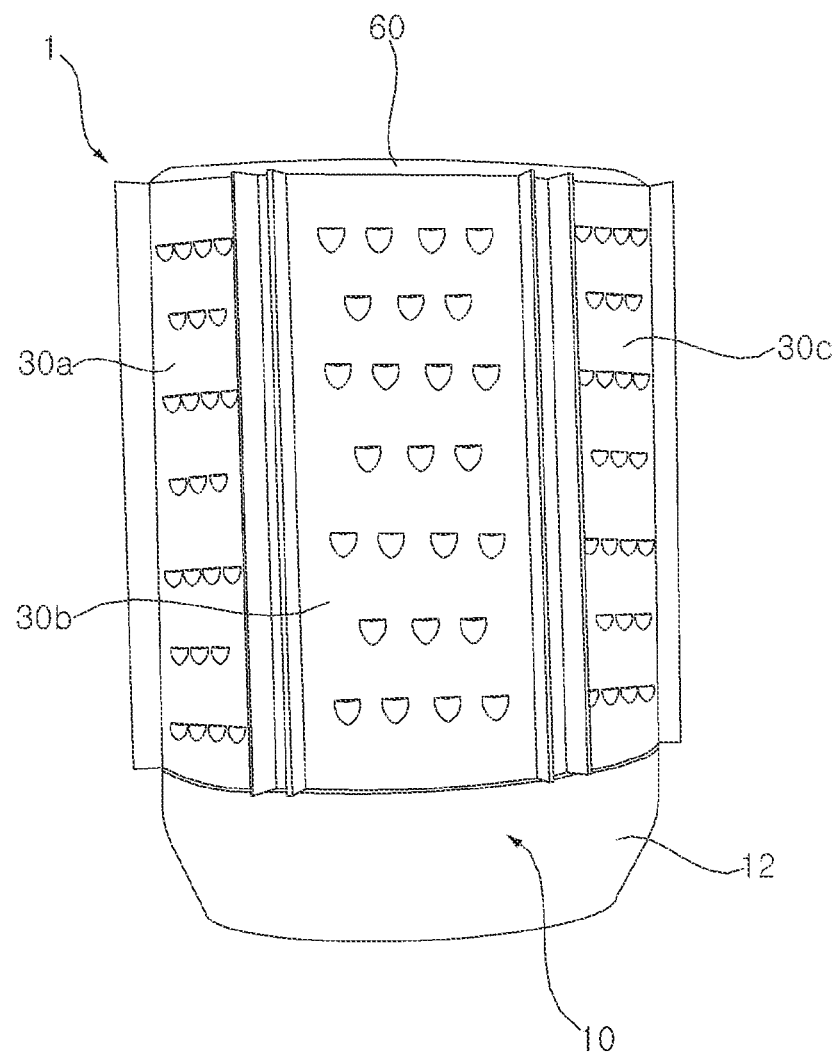
FIG. 1 is a side view showing a plant grower according to an embodiment of the present disclosure in the state in which growing panels are disposed at a second position.

Advantages and features of the present disclosure and a method of achieving the same will be more clearly understood from embodiments described below with reference to the accompanying drawings. However, the present disclosure is not limited to the following embodiments and may be implemented in various different forms. The embodiments are provided merely to complete the present disclosure and to fully provide a person having ordinary skill in the art to which the present disclosure pertains with the category of the present disclosure. The present disclosure is defined only by the category of the claims. Wherever possible, the same reference numerals will be used throughout the specification to refer to the same or like elements.

Hereinafter, a plant grower according to an embodiment of the present disclosure will be described with reference to the accompanying drawings.

Overall Construction

Figure 2:
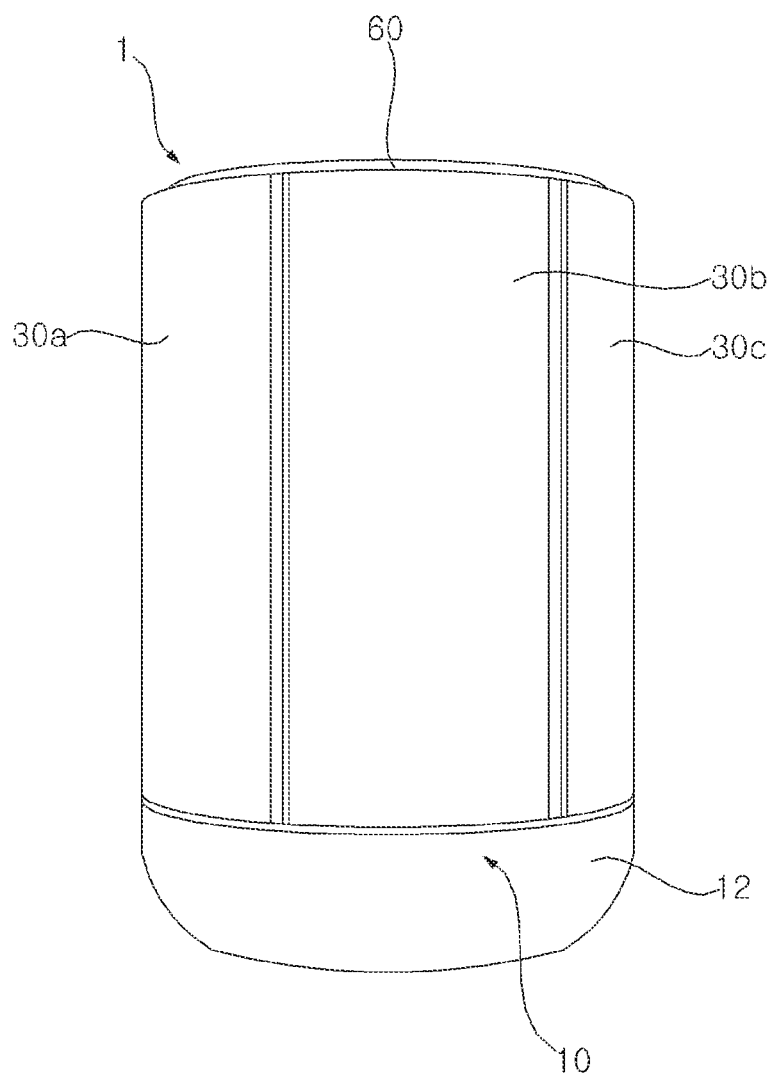
FIG. 2 is a side view showing the plant grower according to the embodiment of the present disclosure in the state in which the growing panels are disposed at a first position.
Figure 3:
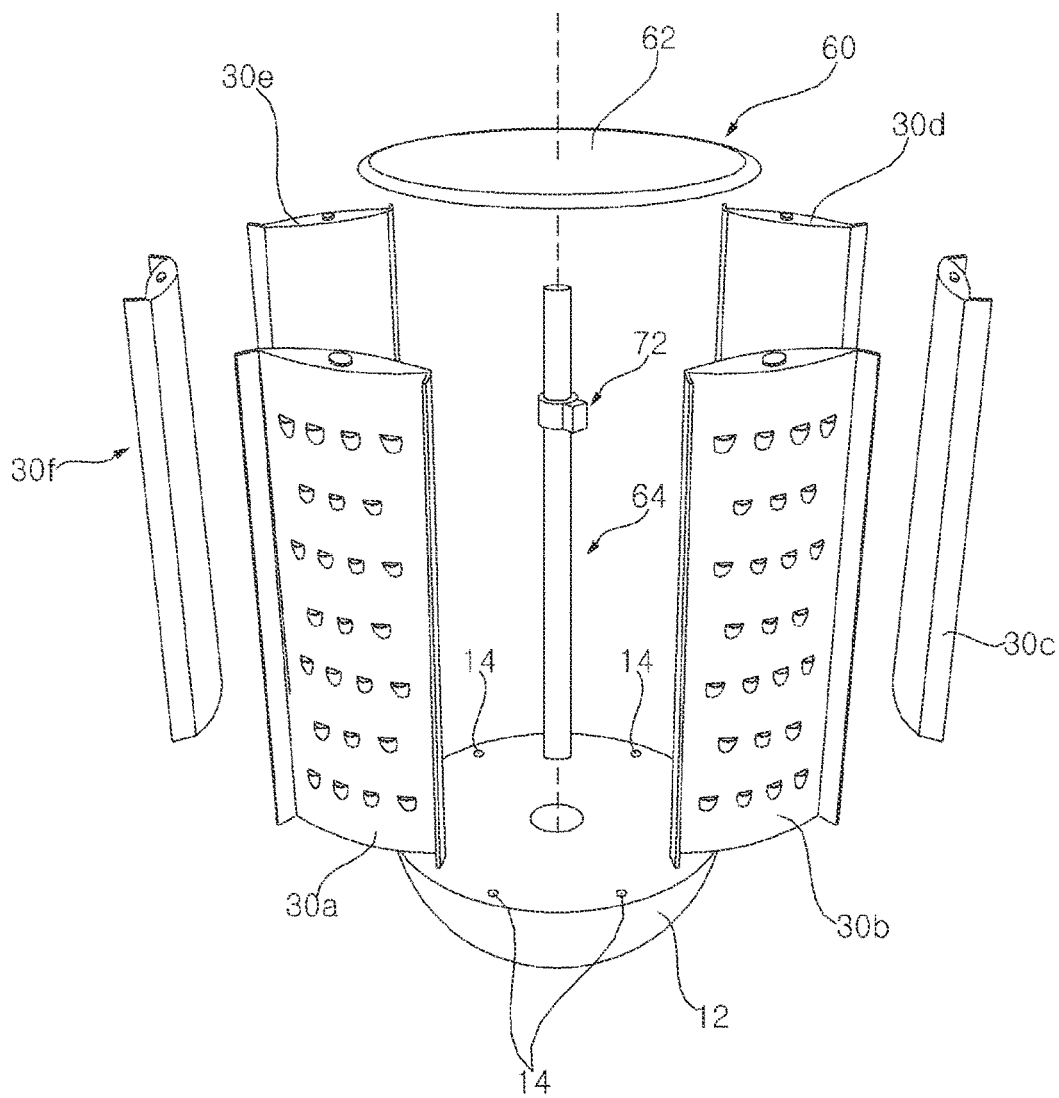
FIG. 3 is an exploded view showing the plant grower according to the embodiment of the present disclosure.
Figure 4:
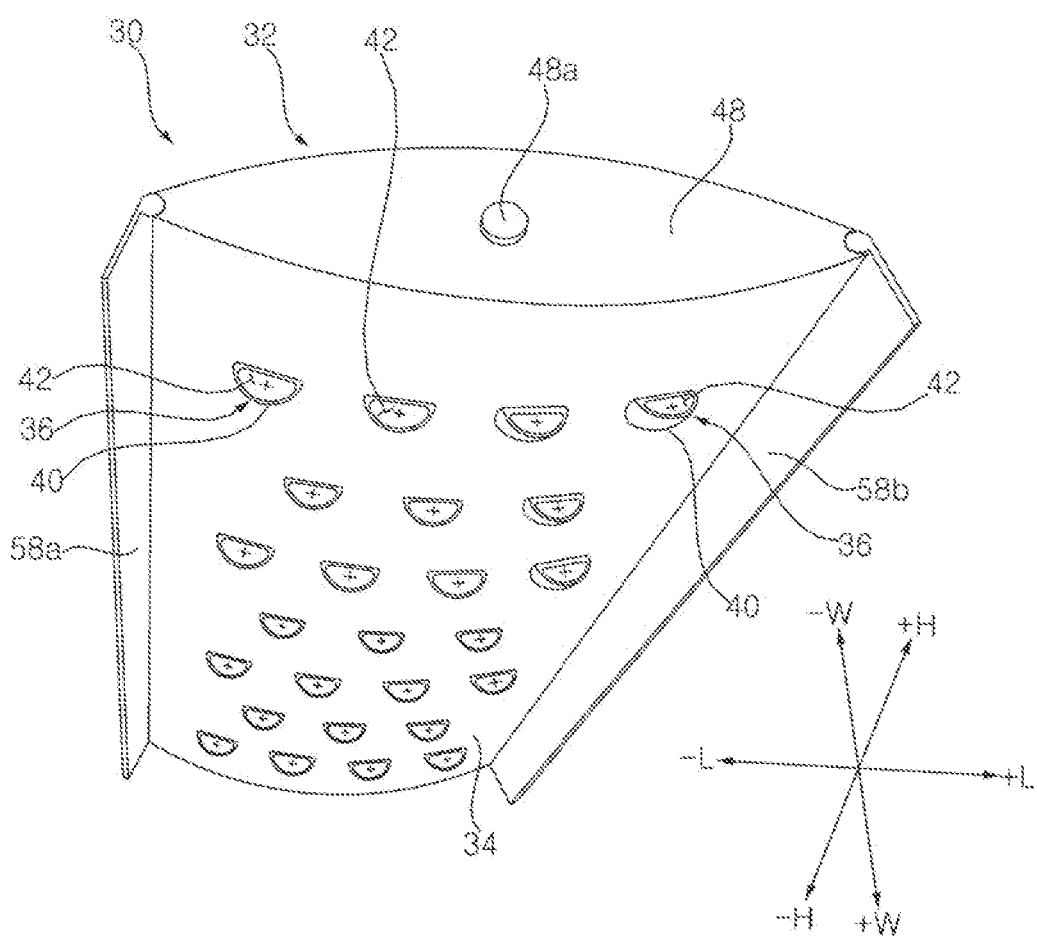
FIG. 4 is a perspective view showing one side of a growing panel according to an embodiment of the present disclosure.
Figure 5:
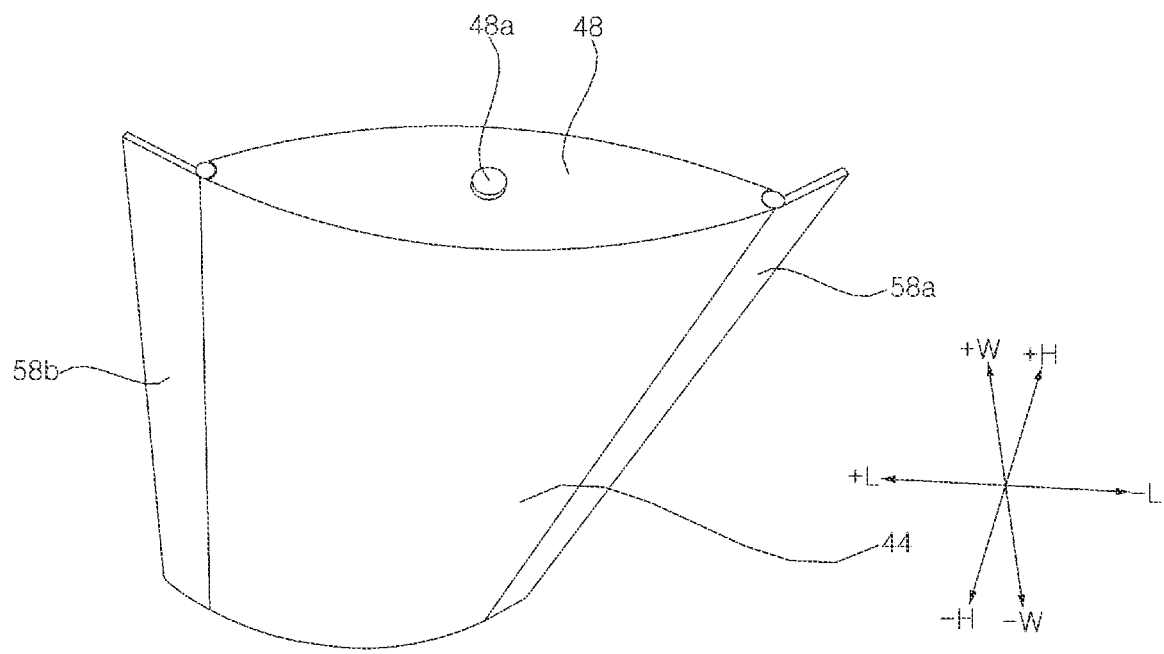
FIG. 5 is a perspective view showing the other side of the growing panel according to the embodiment of the present disclosure.
Figure 6:
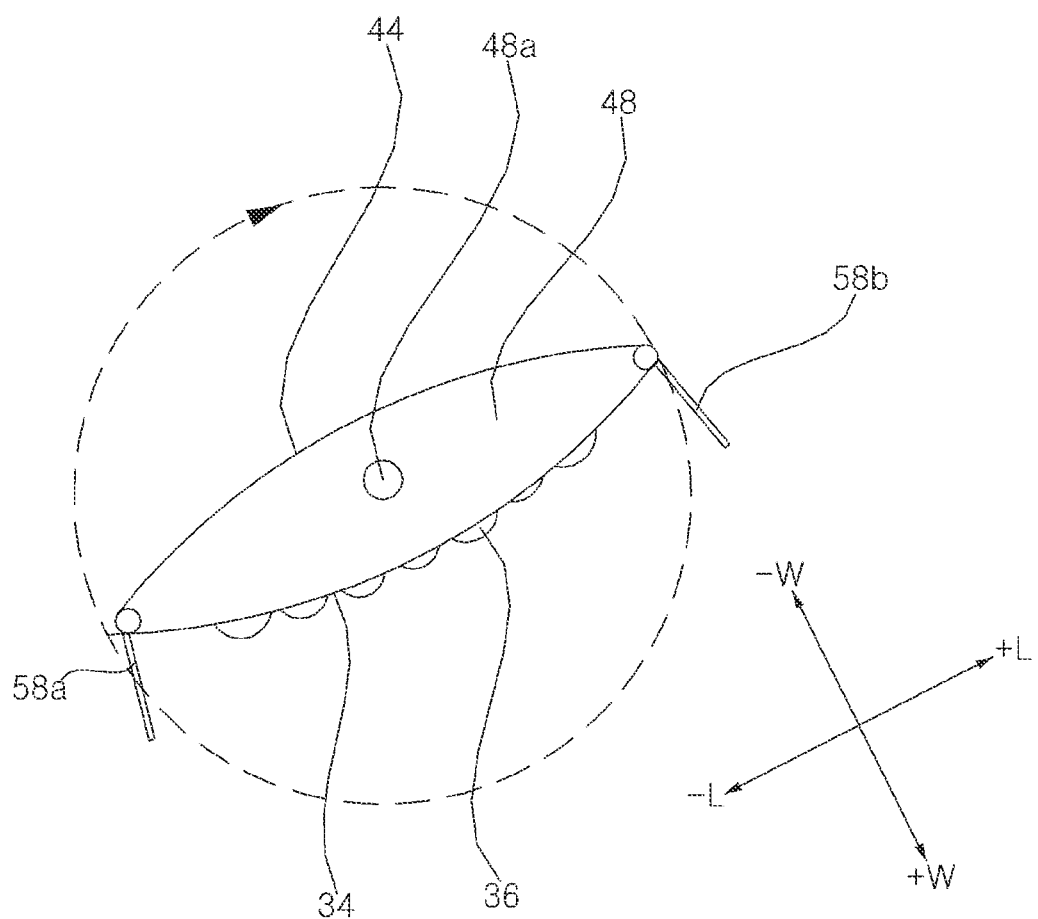
FIG. 6 is a top view of the growing panel according to the embodiment of the present disclosure.

Referring to FIGS. 1 to 3, a plant grower 1 according to the present disclosure includes a base 10, a plurality of growing panels 30a, 30b, 30c, 30d, 30e, and 30f disposed vertically along the circumference of an upper surface of the base 10, the plurality of growing panels 30a, 30b, 30c, 30d, 30e, and 30f being rotatably disposed at the base 10, and an upper cover 60 having a surface parallel to the upper surface of the base 10, the upper cover 60 being disposed above the plurality of growing panels 30a, 30b, 30c, 30d, 30e, and 30f.

Figure 12:
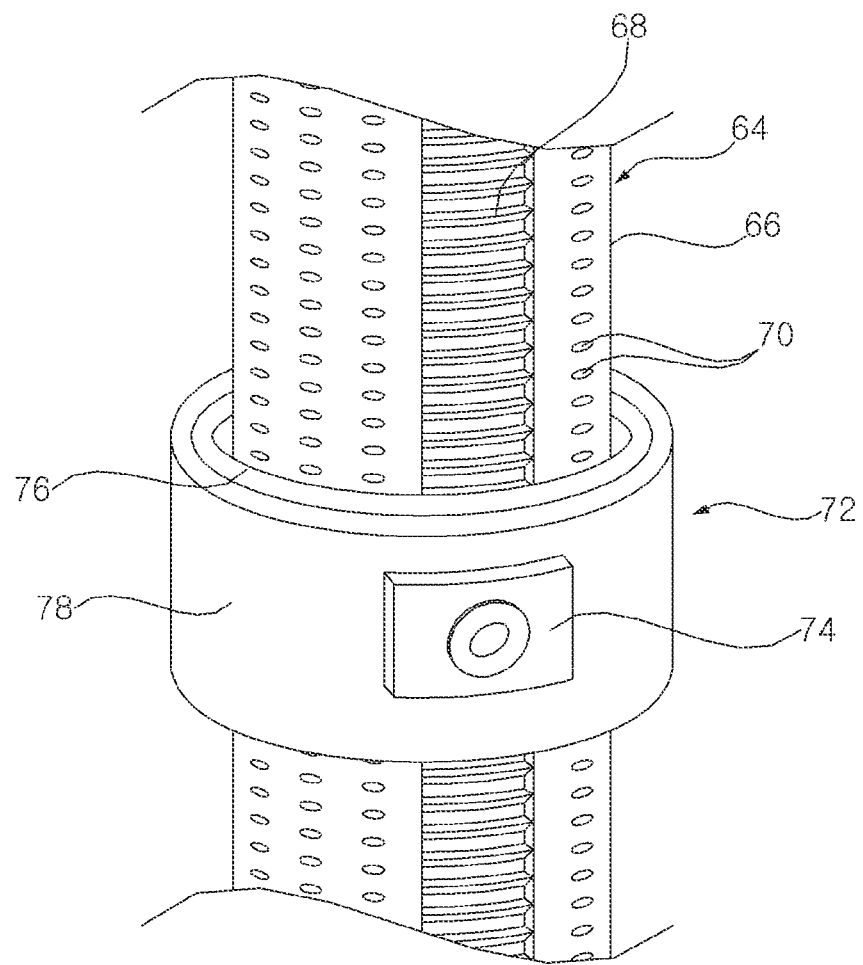
FIG. 12 is a view illustrating the construction of the lighting bar and the image capture unit according to the embodiment of the present disclosure.

As shown in FIG. 12, the plant grower 1 according to the present disclosure may further include a lighting bar 64 extending vertically upwards from the center of the upper surface of the base 10 to the upper cover 60, the lighting bar 64 being configured to emit light toward the plurality of growing panels 30a, 30b, 30c, 30d, 30e, and 30f.

A plurality of growing holders 36, into each of which a plant to be grown is inserted, is disposed at each of the plurality of growing panels 30a, 30b, 30c, 30d, 30e, and 30f. The surface of each of the plurality of growing panels 30a, 30b, 30c, 30d, 30e, and 30f at which the growing holders 36 are disposed may face the lighting bar 64, which is disposed at the center of the base 10, or may face in the direction opposite the lighting bar 64.

The base 10 may rotatably support the plurality of growing panels 30a, 30b, 30c, 30d, 30e, and 30f. A space configured to store water to be supplied to the plurality of growing panels 30a, 30b, 30c, 30d, 30e, and 30f may be defined in the base 10.

Growing Panels

Hereinafter, the plurality of growing panels 30a, 30b, 30c, 30d, 30e, and 30f will be described with reference to FIGS. 3 to 9B.

The plurality of growing panels 30a, 30b, 30c, 30d, 30e, and 30f is rotatably disposed along the circumference of the upper surface of the base 10. Referring to FIG. 3, six growing panels 30a, 30b, 30c, 30d, 30e, and 30f may be disposed along the circumference of the base 10. The number of growing panels 30a, 30b, 30c, 30d, 30e, and 30f may be differently set depending on the size of the base 10 or the width of each of the growing panels 30a, 30b, 30c, 30d, 30e, and 30f.

Figure 9A:
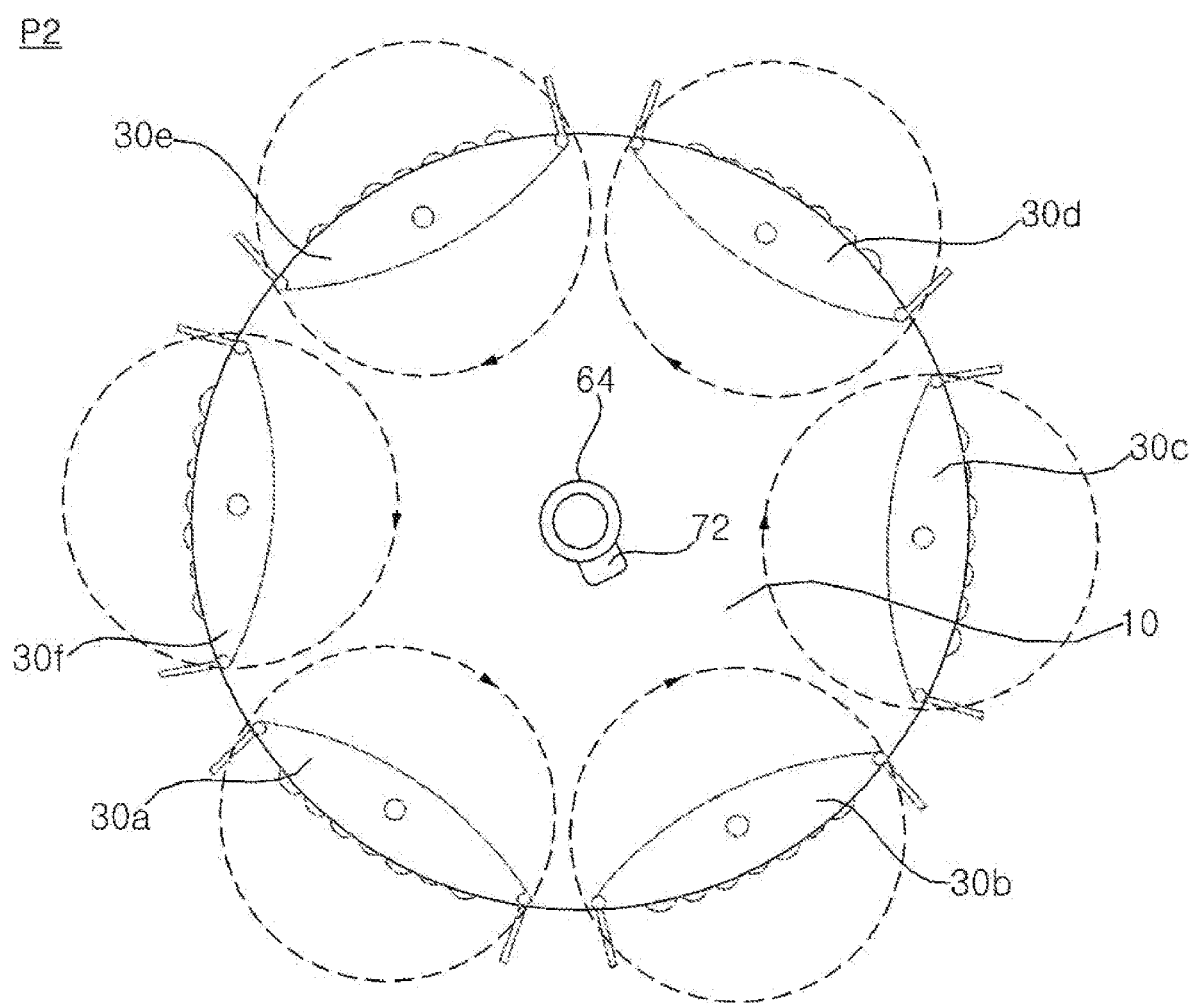
FIG. 9A is a view illustrating the state in which the growing panels according to the embodiment of the present disclosure are disposed at the second position.
Figure 9B:
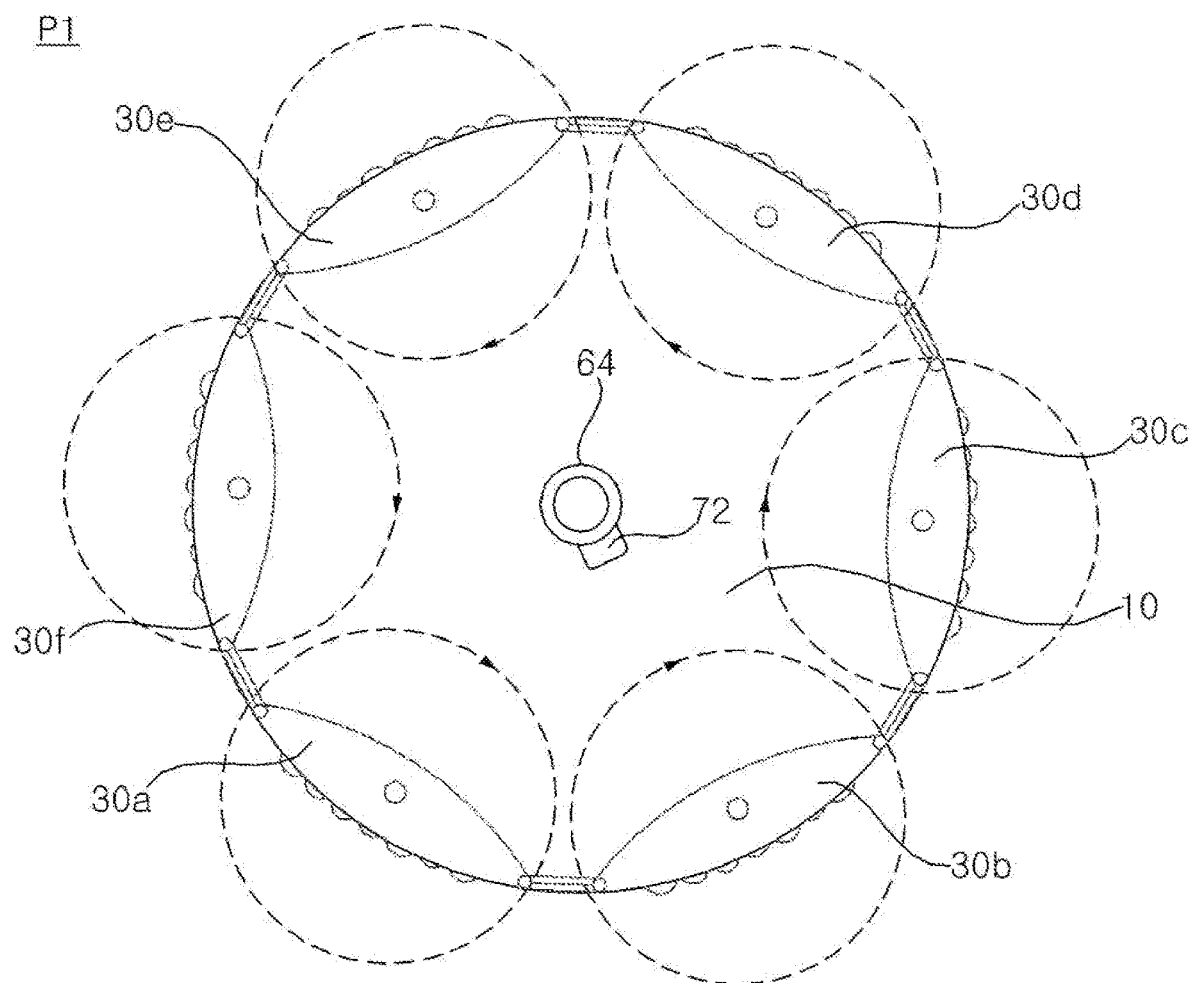
FIG. 9B is a view illustrating the state in which the growing panels according to the embodiment of the present disclosure are disposed at the first position.

The plurality of growing panels 30a, 30b, 30c, 30d, 30e, and 30f may be disposed at a first position P1, at which the surfaces thereof at which the growing holders 36 are disposed face the lighting bar 64, and at a second position P2, which has a phase difference of 180 degrees from the first position and at which the surfaces thereof at which the growing holders 36 are disposed face in the direction opposite the lighting bar 64. That is, when the plurality of growing panels 30a, 30b, 30c, 30d, 30e, and 30f is disposed as shown in FIG. 9B, the position may be set to the first position P1. When the plurality of growing panels 30a, 30b, 30c, 30d, 30e, and 30f is disposed as shown in FIG. 9A, the position may be set to the second position P2.

Hereinafter, the construction of a growing panel will be described with reference to FIGS. 4 to 8. Although the construction of one, denoted by reference numeral 30, of the plurality of growing panels 30a, 30b, 30c, 30d, 30e, and 30f will be described with reference to FIGS. 4 to 8, this description is equally applicable to the other plurality of growing panels 30a, 30b, 30c, 30d, 30e, and 30f.

Referring to FIGS. 4 to 8, the height direction of the growing panel 30 may be denoted by −H and +H, the width direction of the growing panel 30 may be denoted by −W and +W, and the length direction of the growing panel 30 may be denoted by −L and +L. Hereinafter, the construction of the growing panel 30 will be described based thereon.

The growing panel 30 includes a main body 32 rotatably disposed at the base 10 and a pair of wings 58a and 58b disposed at opposite sides of the main body 32 so as to be rotatable relative to the main body 32.

The growing holders 36 are disposed at one surface of the main body 32. A supply pipe 54 is disposed in the main body 32. An inner space, in which an ultraviolet lamp 56 configured to be movable in an upward-downward (i.e., vertical) direction, is defined in the main body 32.

The main body 32 may include a first panel 34, at which the plurality of growing holders 36 is disposed, a second panel 44 coupled to the first panel 34 such that the inner space is defined therebetween, an upper panel 48 configured to cover the upper side of each of the first panel 34 and the second panel 44, and a lower panel 50 configured to cover the lower side of each of the first panel 34 and the second panel 44.

The first panel 34 may have a curved surface that is convex in a direction opposite the second panel 44. The second panel 44 may have a curved surface that is convex in a direction opposite the first panel 34. Consequently, the inner space 32a may be defined between the first panel 34 and the second panel 44.

The plurality of growing holders 36 is disposed at the outer surface of the first panel 34 in the upward-downward direction and in a leftward-rightward (i.e., lateral) direction. Communication holes 42, through which interiors 36a of the growing holders 36 communicate with the inner space 32a, are formed in the portions of the inner surface of the first panel 34 that correspond to the plurality of growing holders 36. Here, the inner surface may be the surface that faces the inner space 32a defined by the first panel 34 and the second panel 44, and the other surface may be the outer surface.

Each growing holder 36 may include a support 40 protruding outwards from the outer surface of the first panel 34, the support 40 being open at the upper side thereof. The support 40 has an opening 42 formed at the upper side thereof such that a user can insert a plant to be grown into the growing holder 36 through the opening.

Each growing holder 36 has a structure allowing the outside of the first panel 34 and the inner space 32a to communicate with each other. When a plant to be grown is inserted into the growing holder 36, therefore, a stem of the plant may be disposed toward the outside of the first panel 34, and a root of the plant may be disposed toward the inner space 32a.

The growing panel may be formed such that the plurality of growing holders 36 is disposed upwards and downwards in the height direction so as to be spaced apart from each other by different distances. Consequently, the user may insert plants to be grown into the plurality of growing holders 36 in consideration of growth speeds of the plants and the distance by which the plurality of growing holders 36 is spaced apart from each other in the upward-downward direction.

The supply pipe 54 is configured to supply water or nutrients to the plants to be grown, which are inserted into the growing holders 36, and the supply pipe 54 may be disposed in the inner space 32a of the growing panel 30. The supply pipe 54 may be fixedly disposed at the inner surface of the second panel 44. The supply pipe 54 may inject water or nutrients toward the inner surface of the first panel 34.

The supply pipe 54 includes a vertical pipe 54a vertically formed in the inner space 32a so as to extend upwards and downwards in the height direction of the growing panel 30 through the lower panel 50, a horizontal pipe 54b diverging leftwards and rightwards from the vertical pipe 54a in the length direction of the growing panel 30, and a nozzle 54c bent from one end of the horizontal pipe 54b toward the first panel 34, the nozzle 54c having an injection hole formed thereon.

The vertical pipe 54a is fixedly disposed at the inner surface of the second panel 44 and extends upwards from the middle of the second panel 44. A plurality of horizontal pipes 54b may be disposed so as to be spaced apart from each other in the upward-downward direction of the vertical pipe 54a. A pair of horizontal pipes 54b may extend from the vertical pipe 54a in the leftward-rightward direction.

Figure 7:
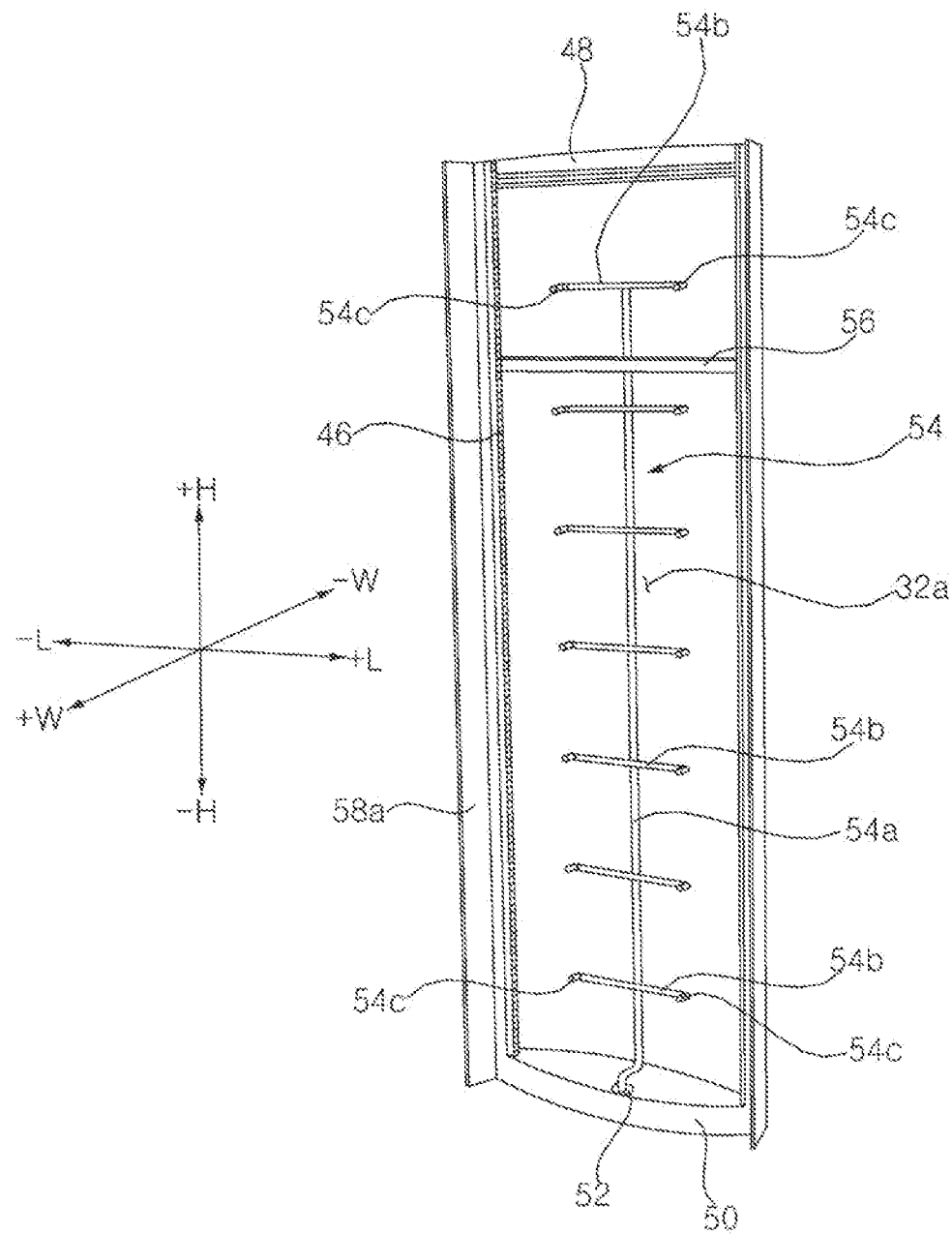
FIG. 7 is a view illustrating the inner construction of the growing panel according to the embodiment of the present disclosure.
Figure 8:
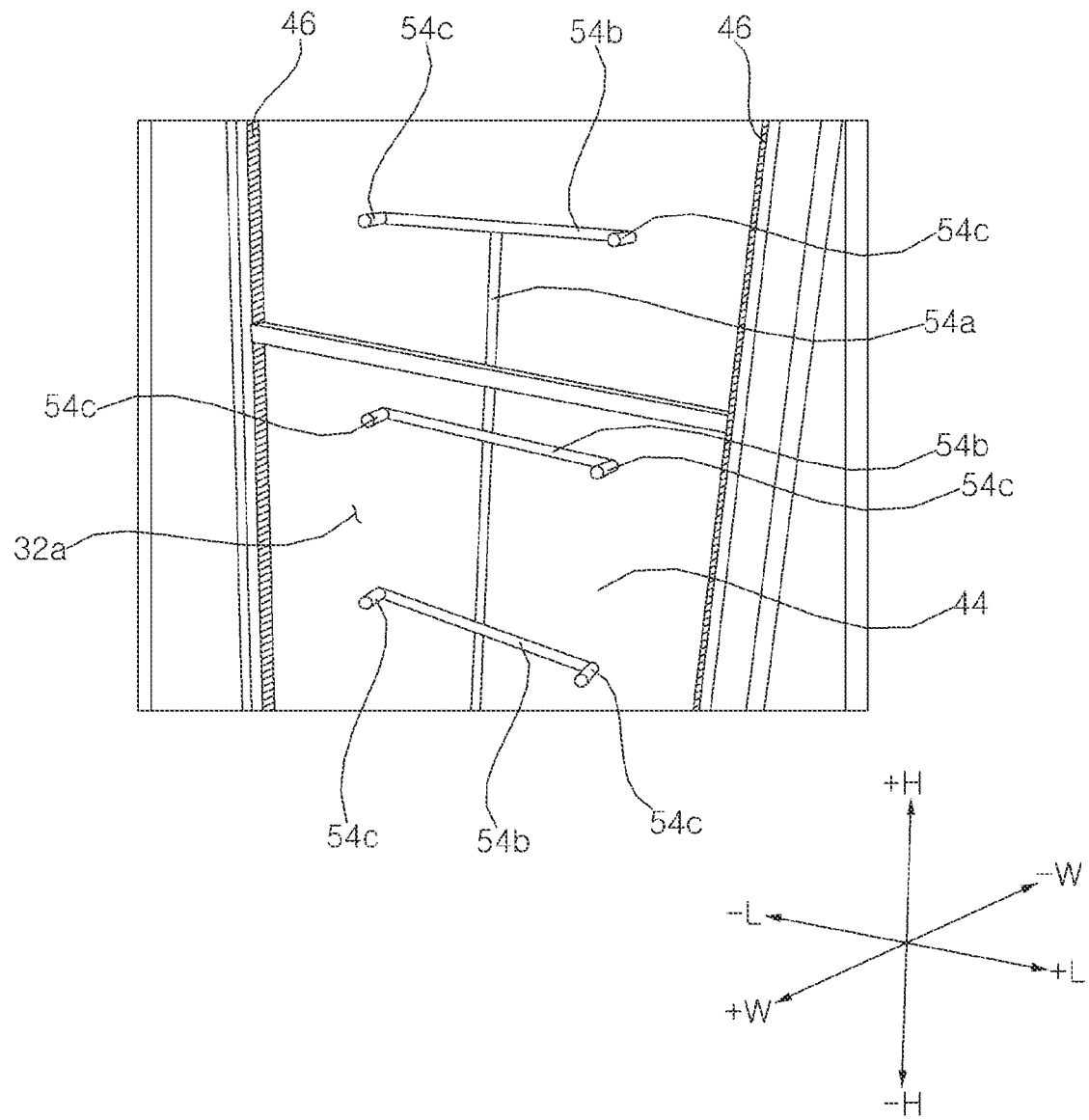
FIG. 8 is a view illustrating an ultraviolet lamp disposed inside the growing panel according to the embodiment of the present disclosure.

The ultraviolet lamp 56, configured to move in the upward-downward direction, may be disposed in the inner space 32a. Referring to FIG. 7, the ultraviolet lamp 56 may be long in the horizontal direction and may emit ultraviolet light to the inner space 32a. The ultraviolet lamp 56 emits ultraviolet light to the inner surface of the first panel 34 and the inner surface of the second panel 44. The ultraviolet lamp 56 is disposed between the supply pipe 54 and the first panel 34.

A guide rail 46, configured to guide movement of the ultraviolet lamp 56 is disposed at the inner surface of the second panel 44. The guide rail 46 is disposed at each end of the inner surface of the second panel 44 so as to extend in the upward-downward direction. The guide rail 46 may have a rack gear structure. The ultraviolet lamp 56 may include an ultraviolet lamp moving motor and a pinion gear. The ultraviolet lamp 56 may move in the upward-downward direction as the result of driving of the motor.

A water drainage hole 52 is formed in the portion of the lower panel 50 at which the center of rotation of the growing panel 30 is located. The upper surface of the lower panel 50 is inclined toward the water drainage hole 52. The supply pipe 54 extends along the inner space 32a through the water drainage hole 52. The lower panel 50 includes a lower hinge protrusion disposed at the center of rotation of the growing panel 30 so as to protrude downwards. The water drainage hole 52 is formed in the portion of the lower panel 50 at which the lower hinge protrusion is disposed. The water drainage hole 52 formed in the lower hinge protrusion is connected to a base drainage pipe 28b, a description of which will follow.

In the same manner, the upper panel 48 also includes an upper hinge protrusion 48a disposed at the center of rotation of the growing panel 30 so as to protrude upwards. A hinge recess, into which the upper hinge protrusion 48a is inserted, is formed in the upper cover 60, disposed at the upper side of the growing panel 30.

The pair of wings 58a and 58b is disposed at opposite ends of the main body 32 in the height direction so as to be rotatable relative to the main body 32. Each of the pair of wings 58a and 58b is disposed at a corresponding one of the opposite ends of the main body 32. The pair of wings 58a and 58b is rotatably disposed at the main body 32.

At least one wing motor configured to rotate each of the pair of wings 58a and 58b may be disposed at the main body 32. The wing motors may be disposed at the upper end and the lower end of the main body to change the disposition of the pair of wings 58a and 58b.

The end of each of the pair of wings 58a and 58b may be disposed in a direction in which the outer surface of the first panel 34 faces. Here, the direction in which the outer surface of the first panel 34 faces, which is a direction in which each of the pair of wings 58a and 58b is disposed so as to be inclined relative to the outer surface of the first panel 34, may be defined as shown in FIG. 9A.

The end of each of the pair of wings 58a and 58b may be disposed in a direction parallel to the outer surface of the second panel 44. Here, the direction parallel to the outer surface of the second panel 44, which is a direction in which each of the pair of wings 58a and 58b is disposed so as not to be inclined relative to the outer surface of the second panel 44, may be defined as shown in FIG. 9B.

At the first position P1 of the growing panel 30, each of the pair of wings 58a and 58b is disposed in the direction parallel to the outer surface of the second panel 44. At the second position P2 of the growing panel 30, each of the pair of wings 58a and 58b is disposed in the direction in which the outer surface of the first panel 34 faces.

The pair of wings 58a and 58b may include a first wing 58a disposed at one end of the growing panel 30 and a second wing 58b disposed at the other end of the growing panel 30. The first wing 58a and the second wing 58b may be independently operated.

When the disposition of the pair of wings 58a and 58b is changed, the first wing 58a and the second wing 58b may be operated while having time difference therebetween such that wings disposed at adjacent growing panels 30 do not interfere with each other during movement thereof. That is, the disposition of the first wing 58a may be changed, and then the disposition of the second wing 58b may be changed.

In an embodiment, when the disposition of the pair of wings 58a and 58b is changed from the disposition in the direction in which the outer surface of the first panel 34 faces to the disposition in the direction parallel to the outer surface of the second panel 44, the disposition of the first wing 58a is changed first, and then the disposition of the second wing 58b is changed. In addition, when the disposition of the pair of wings 58a and 58b is changed from the disposition in the direction parallel to the outer surface of the second panel 44 to the disposition in the direction in which the outer surface of the first panel 34 faces, the disposition of the second wing 58b is changed first, and then the disposition of the first wing 58a is changed.

Referring to FIG. 9B, when each of the pair of wings 58a and 58b is disposed in the direction parallel to the outer surface of the second panel 44 at the first position P1 of the growing panel 30, each wing is disposed so as to overlap an wing adjacent thereto. When each of the pair of wings 58a and 58b is disposed in the direction parallel to the outer surface of the second panel 44 at the first position P1 of the growing panel 30, the plurality of growing panels 30a, 30b, 30c, 30d, 30e, and 30f may be generally disposed in a circular form.

Base and Upper Cover

Figure 10:
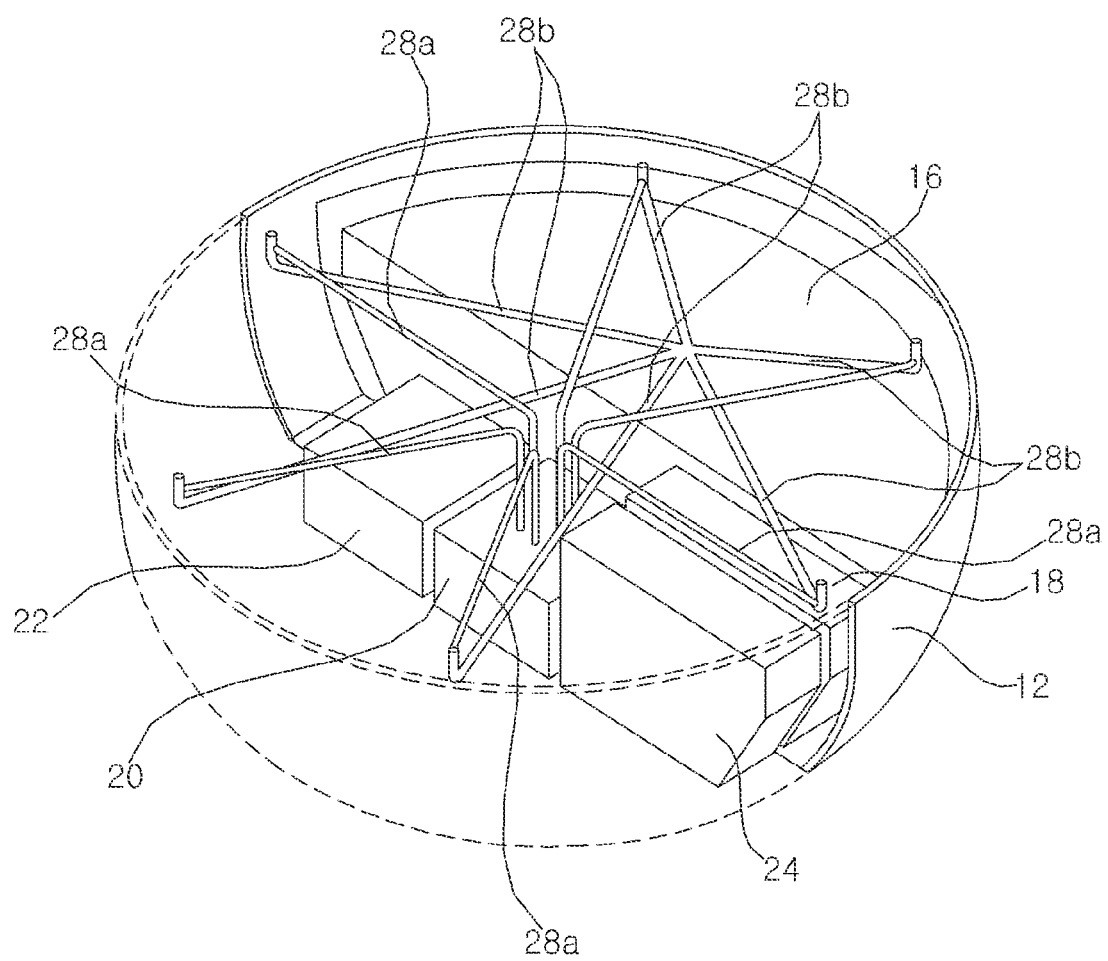
FIG. 10 is a view illustrating the construction of a base according to an embodiment of the present disclosure.

Hereinafter, the base and the upper cover will be described with reference to FIGS. 3 and 10.

The base 10 includes a base housing 12 configured to define the external appearance thereof, a first storage tank 16 disposed in the base housing 12, the first storage tank 16 being configured to store water, a second storage tank 18 disposed in the base housing 12, the second storage tank 18 being configured to store nutrients, a pump 20 configured to feed the water stored in the first storage tank 16 or the nutrients stored in the second storage tank 18 to the supply pipe 54, and a power supply 22 configured to supply electric power to the pump 20 or the lighting bar 64.

A plurality of base water supply pipes 28a, which is connected to the pump 20 and each of which is configured to send the water discharged from the pump 20 to the supply pipe 54 disposed at the growing panel 30, is disposed in the base housing 12.

A plurality of base water drainage pipes 28b, which is connected to the first storage tank 16 and which is connected to the water drainage holes 52 formed in the plurality of growing panels 30a, 30b, 30c, 30d, 30e, and 30f, is disposed in the base housing 12. The base water supply pipes 28a may extend to the water drainage holes 52 through the base water drainage pipes 28b.

The base housing 12 is provided with a hinge hole 14, into which the lower hinge protrusion of the growing panel 30 is inserted. A hinge motor engaged with the lower hinge protrusion to rotate the lower hinge protrusion may be disposed at the base housing 12. The growing panel 30 may be rotated to the first position P1 or the second position P2 as the result of the operation of the hinge motor.

The hinge motor is disposed so as to be engaged with at least one of the upper hinge protrusion 48a and the lower hinge protrusion. The hinge motor rotates at least one of the upper hinge protrusion 48a and the lower hinge protrusion to rotate the growing panel 30.

The first storage tank 16 and the pump 20 are connected to each other via a separate first connection pipe. When the pump 20 is operated, therefore, the water stored in the first storage tank 16 may flow to the supply pipe 54 via a corresponding one of the base water supply pipes 28a.

As the result of operation of the pump 20, the water stored in the first storage tank 16 may flow to the inner space 32a of the growing panel 30 via the supply pipe 54. The water discharged to the inner space 32a may flow to a corresponding one of the base water drainage pipes 28b via the water drainage hole 52 and may then flow to the first storage tank 16. That is, the water in the first storage tank 16 may circulate as the result of operation of the pump 20.

The first storage tank 16 may include a water supply unit configured to receive water from an external water source and a water drainage unit configured to discharge the water stored therein to the outside.

The second storage tank 18 and the pump 20 may be connected to each other via a separate second connection pipe. An opening and closing valve configured to open and close the second connection pipe may be disposed in the second connection pipe. When the opening and closing valve is opened and the pump 20 is operated, therefore, the nutrients stored in the second storage tank 18 may be supplied to the supply pipe 54 via a corresponding one of the base water supply pipes 28a.

When the pump 20 is operated, the opening and closing valve may open the second connection pipe. However, the opening and closing valve may close the second connection pipe a predetermined time after the pump 20 is operated. As a result, a predetermined amount of nutrients discharged from the second storage tank 18 may be supplied to the growing panel 30, and the residual amount of nutrients may be introduced into the first storage tank 16 and then resupplied to the growing panel 30.

The power supply 22 may receive electric power from the outside and may supply the electric power to the pump 20, the lighting unit 70, or the hinge motor.

The base 10 may include a battery 24 configured to store power. Further, the upper cover 60 may include a solar panel 62. The battery 24 be electrically connected to the solar panel 62 disposed at the upper cover 60 to receive electric power from the solar panel 62 and may store the electric power. The battery 24 may supply the electric power to the power supply 22.

The upper cover 60 is disposed above the base 10 so as to be spaced apart from the base 10. The upper cover 60 is disposed in parallel to the upper surface of the base 10. The upper cover 60 is disposed at the upper side of the lighting bar 64. The upper cover 60 is disposed at the upper side of each of the plurality of growing panels 30a, 30b, 30c, 30d, 30e, and 30f. The upper cover 60 supports the upper side of a rotary shaft of each of the plurality of growing panels 30a, 30b, 30c, 30d, 30e, and 30f. The lighting bar 64 is disposed at the center of the upper cover 60. The growing panel 30a is rotatably disposed along the circumference of the upper cover 60.

The upper cover 60 may include a solar panel 62 configured to generate electricity using sunlight.

The solar panel 62 is a kind of solar cell configured to convert solar energy of sunlight into electrical energy. The solar panel 62 uses a P-type semiconductor and an N-type semiconductor, and generates electricity in a manner in which, when light is emitted, an electric charge moves therein, whereby a potential difference is generated between a P pole and an N pole. The solar panel 62 may be manufactured in the form of a panel in which one or more solar cells are connected to each other.

The solar panel 62 may be electrically connected to the battery 24 disposed in the base 10. The solar panel 62 may store generated electrical energy in the battery 24.

Lighting Bar and Image Capture Unit

Figure 11:
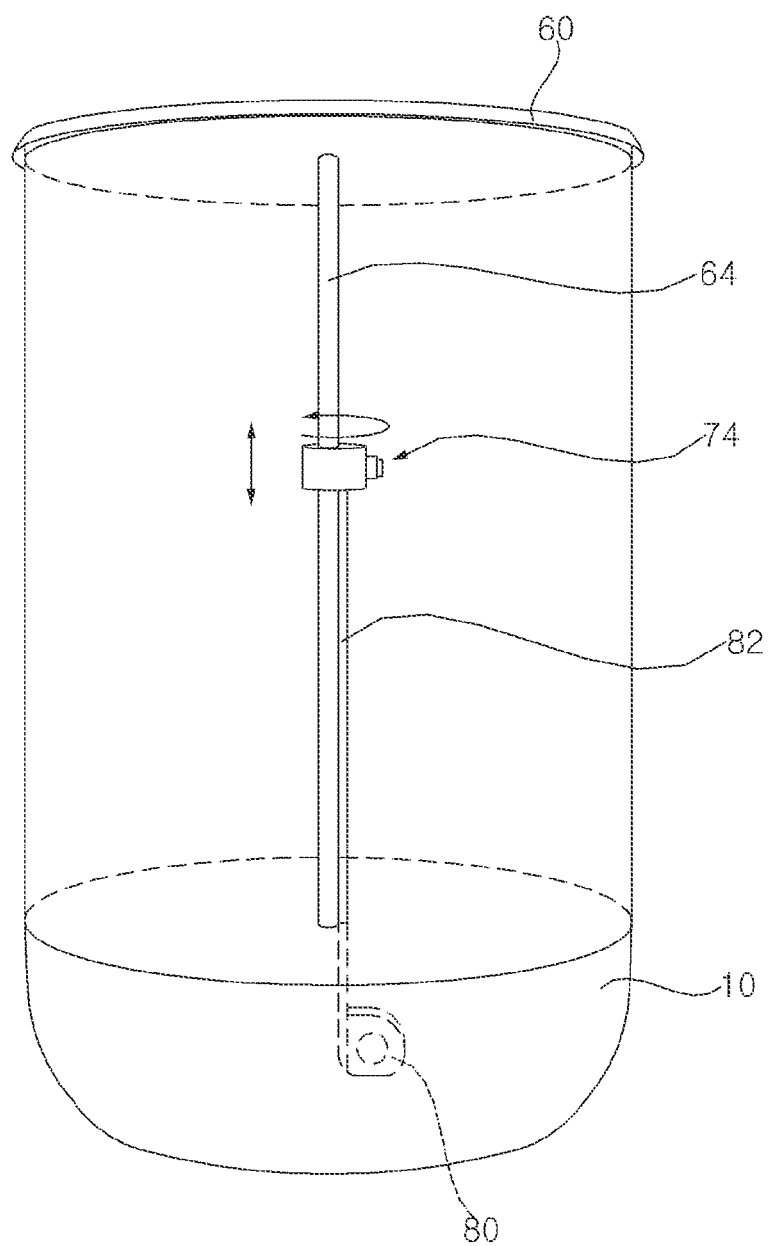
FIG. 11 is a side view illustrating the disposition of a lighting bar and an image capture unit according to an embodiment of the present disclosure.
Figure 13:
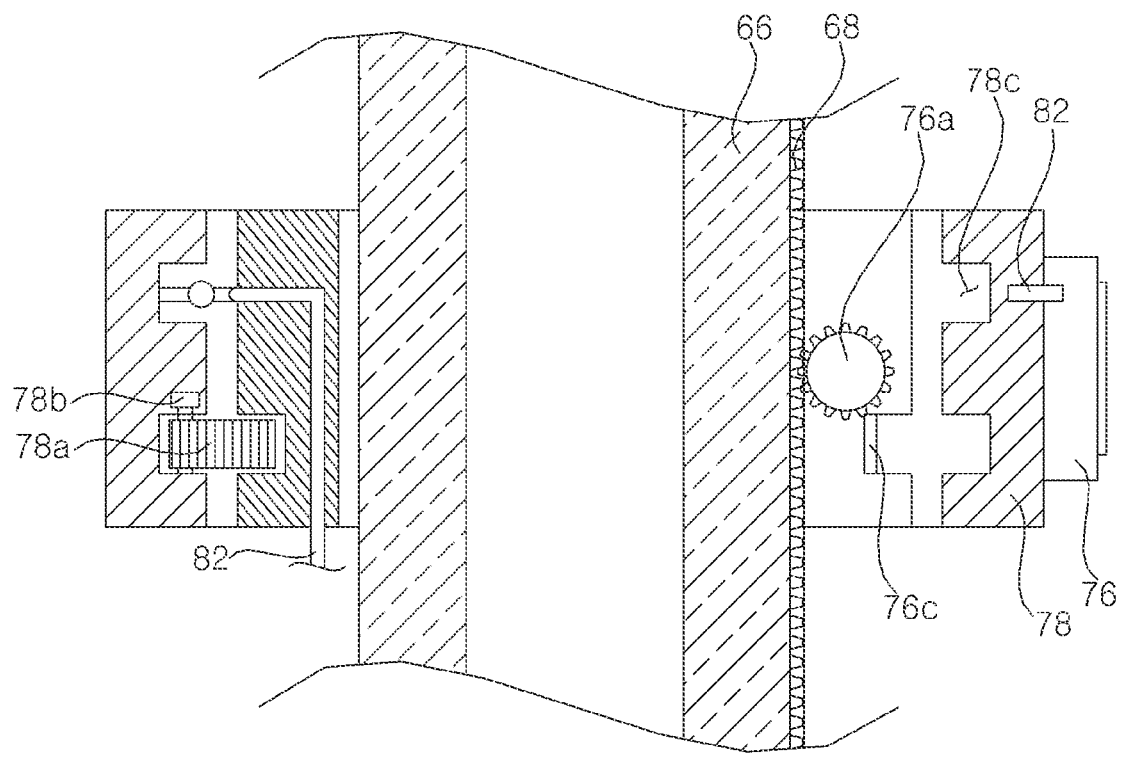
FIG. 13 is a schematic sectional view illustrating the construction of the image capture unit according to the embodiment of the present disclosure.
Figure 14:
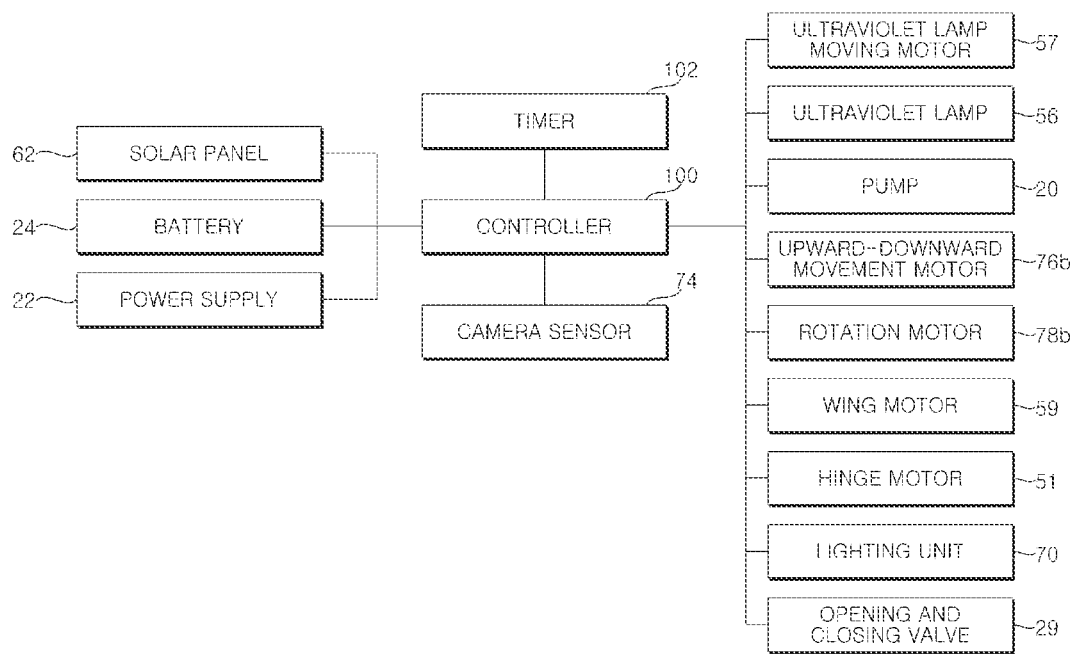
FIG. 14 is a configuration of the plant grower according to an embodiment of the present disclosure.

Hereinafter, the lighting bar 64 and the image capture unit 72 (i.e., camera) will be described with reference to FIGS. 11 to 13.

The lighting bar 64 has a cylindrical shape and is disposed between the upper cover 60 and the base 10. The lighting bar 64 includes a post 66 formed in a cylindrical shape, the post 66 extending in the upward-downward direction, and a lighting unit 70 disposed at the circumferential surface of the post 66. The lighting unit 70 is disposed along the circumference of the post 66. The lighting unit 70 may include a plurality of LED lights. The lighting unit 70 is disposed 360 degrees to emit light to the plurality of growing panels 30a, 30b, 30c, 30d, 30e, and 30f, disposed outside the circumference of the lighting bar 64. In addition, the lighting unit 70 is disposed in the upward-downward direction in order to emit light to each of the growing holders 36 disposed upwards and downwards at each of the plurality of growing panels 30a, 30b, 30c, 30d, 30e, and 30f, disposed outside the circumference of the lighting bar 64.

An upward-downward movement rail 68 configured to guide upward-downward movement of the image capture unit 72 is disposed at one side of the post 66. The upward-downward movement rail 68 is formed at one side of the post 66 so as to extend in the upward-downward direction. The image capture unit 72 may move along the upward-downward movement rail 68 in the upward-downward direction of the post 66. The upward-downward movement rail 68 may have a rack gear shape.

The image capture unit 72 is disposed around the lighting bar 64. The image capture unit 72 is disposed so as to be movable along the lighting bar 64 in the upward-downward direction. The image capture unit 72 is configured to capture images of the states of plants mounted to the plurality of growing panels 30a, 30b, 30c, 30d, 30e, and 30f.

The image capture unit 72 is disposed outside the post 66. The image capture unit 72 may capture images of the states of plants disposed at the growing panels disposed outside the post 66 so as to be spaced apart from each other.

The image capture unit 72 includes a camera sensor 74, an upward-downward movement unit (i.e., upward-downward movement assembly) 76 configured to move the camera sensor 74 in the upward-downward direction, and a rotation unit (i.e., rotator) 78 configured to rotate the camera sensor 74 360 degrees in a direction perpendicular to the direction in which the upward-downward movement unit 76 moves.

The camera sensor 74 is disposed to capture images of each of the plurality of growing panels 30a, 30b, 30c, 30d, 30e, and 30f. The camera sensor 74 is disposed at one side of the rotation unit 78. The rotation unit 78 has a ring shape, and is rotatably disposed outside the upward-downward movement unit 76. The rotation unit 78 is rotatable 360 degrees relative to the upward-downward movement unit 76. Consequently, it is possible to capture images of the states of plants disposed at each of the plurality of growing panels 30a, 30b, 30c, 30d, 30e, and 30f.

The upward-downward movement unit 76 may have a ring-shaped structure surrounding the outside of the post 66, and may move in the upward-downward direction of the post 66. The upward-downward movement unit 76 may include an upward-downward movement gear 76a engaged with the upward-downward movement rail 68 and an upward-downward movement motor 76b configured to rotate the upward-downward movement gear 76a.

The upward-downward movement unit 76 may be connected to the power supply 22 via a separate electric wire 82. Referring to FIG. 11, a cord reel 80 configured to apply attractive force (e.g., pulling, rotational or circumferential force) to the electric wire connected to the upward-downward movement unit 76 may be disposed inside the base housing 12. Consequently, the cord reel 80 applies a predetermined magnitude of attractive force to the electric wire connected to the image capture unit 72, whereby tension of the electric wire may be maintained during upward-downward movement of the upward-downward movement unit 76.

A rotation rail 76c configured to guide rotation of the rotation unit 78 is disposed at the outer circumference of the upward-downward movement unit 76. The rotation rail 76c is formed along the circumferential surface of the upward-downward movement unit 76 so as to have a rack gear shape.

The rotation unit 78 may include a rotation gear 78a engaged with the rotation rail 76c and a rotation motor 78b configured to rotate the rotation gear 78a. An electric wire space 78c, in which the wire connected to the upward-downward movement unit 76 is disposed, may be defined in the rotation unit 78. The electric wire space 78c is horizontally formed at the inner surface of the rotation unit 78. The electric wire space 78c has a recess formed in the inner surface of the rotation unit 78. The electric wire disposed in the electric wire space 78c may have a length set in consideration of the movement distance thereof due to rotation of the rotation unit 78.

Controller

The plant grower 1 according to the present disclosure includes a controller 100 configured to control disposition of the plurality of growing panels 30a, 30b, 30c, 30d, 30e, and 30f or to adjust the amount of water that is supplied to each of the plurality of growing panels 30a, 30b, 30c, 30d, 30e, and 30f.

The controller 100 may control disposition of the plurality of growing panels 30a, 30b, 30c, 30d, 30e, and 30f. That is, the controller 100 may perform control such that each of the plurality of growing panels 30a, 30b, 30c, 30d, 30e, and 30f is disposed at the first position P1, as shown in FIG. 9B, or at the second position P2, as shown in FIG. 9A. The controller 100 may drive the hinge motor 51 to control disposition of each of the plurality of growing panels 30a, 30b, 30c, 30d, 30e, and 30f.

The controller 100 may control disposition of the pair of wings 58a and 58b disposed at opposite ends of each of the plurality of growing panels 30a, 30b, 30c, 30d, 30e, and 30f. The controller 100 may change disposition of the pair of wings 58a and 58b based on disposition of each growing panel. The controller 100 may operate the wing motor 59 connected to at least one of the upper hinge protrusion 48a and the lower hinge protrusion in order to change disposition of the pair of wings 58a and 58b.

The controller 100 may perform control such that the pair of wings 58a and 58b is disposed in the direction parallel to the outer surface of the second panel 44 when each of the plurality of growing panels 30a, 30b, 30c, 30d, 30e, and 30f is disposed at the first position P1. The controller 100 may perform control such that the pair of wings 58a and 58b is disposed in the direction in which the outer surface of the first panel 34 faces when each of the plurality of growing panels 30a, 30b, 30c, 30d, 30e, and 30f is disposed at the second position P2.

The controller 100 may control disposition of the image capture unit 72. The controller 100 may control the upward-downward movement unit 76 and the rotation unit 78 to adjust the direction in which the camera sensor 74 faces. Specifically, the controller 100 may operate the upward-downward movement motor 76b or the rotation motor 78b to adjust the direction in which the camera sensor 74 faces.

The controller 100 may control operation of the pump 20 to supply water or nutrients into the growing panels. The plant grower 1 according to the present disclosure may further include a timer 102. The controller 100 may periodically operate the pump 20 based on time measured by the timer 102.

In addition, the controller 100 may perform control such that the opening and closing valve 29 configured to open and close between the second storage tank 18 and the pump 20 is opened when the pump 20 is operated and the opening and closing valve 29 is closed after a predetermined time.

The controller 100 may perform control such that the lighting unit 70 of the lighting bar 64 is turned on/off. The controller 100 may control on/off of the lighting unit 70 in consideration of disposition of the plurality of growing panels 30a, 30b, 30c, 30d, 30e, and 30f. That is, when the plurality of growing panels 30a, 30b, 30c, 30d, 30e, and 30f is disposed at the first position P1, as shown in FIG. 9B, the controller 100 may perform control such that the lighting unit 70 is turned on. In addition, when the plurality of growing panels 30a, 30b, 30c, 30d, 30e, and 30f is disposed at the second position P2, as shown in FIG. 9A, the controller 100 may perform control such that the lighting unit 70 is turned off.

The controller 100 may operate the ultraviolet lamp moving motor 57 such that the ultraviolet lamp 56 moves upwards and downwards in each growing panel, or may perform control such that the ultraviolet lamp 56 is turned on/off.

The controller 100 may perform control such that the camera sensor 74 captures images of the first panel 34 of each of the plurality of growing panels 30a, 30b, 30c, 30d, 30e, and 30f. The controller 100 may perform control such that the power supply 22 supplies electric power to the above-described units such that the units are operated. In addition, the controller 100 may perform control such that electric power supplied from the solar panel 62 is stored in the battery 24 or is sent to the power supply 22. The controller 100 may perform control such that the power supply 22 receives electric power from the solar panel 62, the battery 24, or an external power source.

As is apparent from the above description, the plant grower according to the present disclosure has one or more of the following effects.

First, the growing panels may be rotated, whereby disposition of the growing panels may be changed, whereby external natural light may be provided to plants, or light emitted from the lighting bar disposed in the plant grower may be provided to the plants. Consequently, the plant grower may be installed indoors or outdoors. Also, in the case in which the plant grower is installed outdoors, light may be supplied to the plants even at night.

Second, gaps between the growing panels may be covered using the wings, whereby light emitted from the lighting bar may not be discharged to the outside. In addition, effects on plants due to external factors, such as wind, may be minimized.

Third, water may be supplied to plants in the growing holders via the supply pipe disposed in each growing panel, whereby user management may be easily performed.

The effects of the present invention are not limited to those mentioned above, and other unmentioned effects will be clearly understood by a person having ordinary skill in the art to which the present invention pertains from the above description.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A plant grower, comprising:
a base including an upper surface;
an upper cover disposed above the base and spaced apart from the upper surface of the base;
a plurality of growing panels disposed along a circumference of the upper surface of the base, each of the plurality of growing panels being rotatably disposed at the base and the upper cover, each of the plurality of growing panels including a plurality of growing holders at a first surface thereof, each of the plurality of growing holders being configured to receive a plant; and
a lighting bar extending vertically upwards from a center of the upper surface of the base to the upper cover, the lighting bar being configured to emit light radially outward,
wherein each of the plurality of growing panels is rotatable between a first position at which the first surface faces the lighting bar and at a second position at which the first surface faces away from the lighting bar,
wherein each of the plurality of growing panels comprises:
a main body rotatably disposed at the base, the plurality of growing holders being disposed at one surface of the main body; and
a pair of wings disposed at opposite sides of the main body and rotatable relative to the main body,
wherein the pair of wings is arranged to open or close a gap formed between each of the plurality of growing panels,
wherein each main body comprises:
a first panel, at which the plurality of growing holders is disposed;
a second panel coupled to the first panel;
an inner space defined between the first panel and the second panel;
an ultraviolet lamp disposed in the inner space defined between the first panel and the second panel, the ultraviolet lamp being configured to:
be movable in a vertical direction, and
emit ultraviolet light towards an inner surface of the first panel and towards an inner surface of the second panel; and
a guide rail disposed at the inner surface of the second panel, the guide rail being configured to guide movement of the respective ultraviolet lamp, and
wherein for each main body, the ultraviolet lamp is configured to move along the guide rail in the vertical direction.

2. The plant grower of claim 1, wherein the lighting bar is configured to emit light when the plurality of growing panels are in the first position.

3. The plant grower of claim 1, wherein the pair of wings face adjacent growing panels of the plurality of growing panels when the growing panels are in the first position.

4. The plant grower of claim 1, wherein each first panel has a curved surface that is convex in a first direction, and
wherein each second panel has a curved surface that is convex in a second direction opposite to the first direction.

5. The plant grower of claim 1, wherein each of the plurality of growing holders comprises a communication hole, through which an interior of the growing holder, into which the plant is inserted, and the inner space, communicate with each other, and
wherein each of the plurality of growing panels comprises a supply pipe disposed in the respective inner space, the supply pipe being configured to supply water towards the communication holes.

6. The plant grower of claim 5, wherein the supply pipe comprises:
a vertical pipe extending in a vertical direction;
a plurality of horizontal pipes diverging from the vertical pipe and extending in a horizontal direction perpendicular to the vertical direction; and
a plurality of nozzles facing the first panel, each of the plurality of nozzles extending from one end of a respective one of the horizontal pipes and configured to inject water or nutrients to a respective one of the growing holders.

7. The plant grower of claim 6, wherein each main body further comprises:
an upper panel configured to cover an upper side of each of the first panel and the second panel; and
a lower panel configured to cover a lower side of each of the first panel and the second panel, the upper side of each of the first panel and the second panel being opposite to the lower side of each of the first panel and the second panel, and
wherein a water drainage hole is formed in a portion of the respective lower panel at which a center of rotation of the respective growing panel is located, each water drainage hole being configured to drain water from the main body.

8. The plant grower of claim 7, wherein the lower panel is sloped toward the water drainage hole.

9. The plant grower of claim 5, wherein the base comprises:
- a base housing configured to define an external appearance of the base;
- a first storage tank disposed in the base housing, the first storage tank being configured to store water; and
- a pump disposed in the base housing and configured to pump water stored in the first storage tank, via the supply pipes, to the plurality of growing panels.

10. The plant grower of claim 9, further comprising a plurality of base water supply pipes connected to the pump and disposed in the base housing, each of the plurality of base water supply pipes being configured to send water discharged from the pump to the respective supply pipe disposed at a respective one of the plurality of growing panels.

11. The plant grower of claim 10, wherein each main body further comprises a lower panel configured to cover a lower side of each of the first panel and the second panel,
- wherein a water drainage hole is formed in a portion of the respective lower panel at which a center of rotation of the respective growing panel is located, each water drainage hole being configured to drain water from the main body,
- wherein the plant grower further comprises a plurality of base water drainage pipes connected to the first storage tank and disposed in the base housing, each of the plurality of base water drainage pipes being connected to the respective water drainage hole formed in a respective one of the plurality of growing panels, and
- wherein each of the plurality of base water supply pipes extends to the respective water drainage hole through a respective one of the plurality of base water drainage pipes.

12. The plant grower of claim 9, wherein the base further comprises a second storage tank disposed in the base housing, the second storage tank being configured to store nutrients,
- wherein the second storage tank and the pump are connected to each other via a second connection pipe, and
- wherein an opening and closing valve configured to open and close the second connection pipe is disposed in the second connection pipe.

13. The plant grower of claim 1, wherein the upper cover comprises a solar panel configured to generate electricity using sunlight,
- wherein the base comprises a battery configured to store electric power, and
- wherein the battery is configured to store electric power supplied from the solar panel.

14. The plant grower of claim 1, further comprising a camera disposed on the lighting bar and movable along the lighting bar in the vertical direction, the camera being configured to capture images of states of plants mounted to the plurality of growing panels.

15. The plant grower of claim 14, wherein the camera comprises:
- a camera sensor;
- a vertical movement assembly configured to move the camera sensor in the vertical direction; and
- a rotation assembly configured to rotate the camera sensor 360 degrees while facing in a direction perpendicular to a direction in which the vertical movement assembly moves.

16. A plant grower, comprising:
- a base configured to store and supply water, the base having an upper surface;
- an upper cover spaced apart from the upper surface of the base; and
- a plurality of growing panels disposed along a circumference of the upper surface of the base, the plurality of growing panels being rotatable between a first position facing an interior of the plant grower and a second position facing away from the interior of the plant grower, each of the plurality of growing panels including a plurality of growing holders at a first surface thereof, each of the plurality of growing holders being configured to receive a plant, and
- wherein each of the plurality of growing panels comprises:
  - a first panel, at which the plurality of growing holders is disposed;
  - a second panel coupled to the first panel;
  - an inner space defined between the first panel and the second panel;
  - an ultraviolet lamp disposed in the inner space defined between the first panel and the second panel, the ultraviolet lamp being configured to:
    - be movable in a vertical direction, and
    - emit ultraviolet light towards an inner surface of the first panel and towards an inner surface of the second panel; and
  - a guide rail disposed at the inner surface of the second panel, the guide rail being configured to guide movement of the respective ultraviolet lamp, and
- wherein for each of the plurality of growing panels, the ultraviolet lamp is configured to move along the guide rail in the vertical direction.

* * * * *